United States Patent [19]

Valenta

[11] Patent Number: 4,651,006
[45] Date of Patent: Mar. 17, 1987

[54] REDUCED BACKGROUND SCINTILLATION COUNTING

[75] Inventor: Robert J. Valenta, Berkeley, Ill.

[73] Assignee: Packard Instrument Company, Inc., Downers Grove, Ill.

[21] Appl. No.: 721,266

[22] Filed: Apr. 8, 1985

[51] Int. Cl.[4] .............................................. G01T 1/178
[52] U.S. Cl. ................................ 250/362; 250/363 R; 250/366; 250/369
[58] Field of Search ............... 250/362, 369, 328, 364, 250/361 R, 361 C, 363 R, 366; 364/517, 555, 574

[56] References Cited

U.S. PATENT DOCUMENTS

| | | | |
|---|---|---|---|
| 3,626,187 | 12/1971 | Laney | 250/362 |
| 4,049,966 | 9/1977 | Luitwieler, Jr. | 250/369 |
| 4,528,450 | 7/1985 | Valenta | 250/362 |
| 4,555,629 | 11/1985 | Everett et al. | 250/362 |

OTHER PUBLICATIONS

R. Walraven and Y. Yeh, "Spurious Pulse Rejection in a Photon Correlation Experiment" *Review of Scientific Instruments*, vol. 50, No. 6, (Jun. 1979), pp. 780–786.
D. Horrocks, "Pulse Shape Discrimination" In: *Pulse Shape Discrimination, Applications of Liquid Scintillation Counting* (Academic Press, 1974), pp. 276–289.
"RackBeta 'Spectral' Liquid Scintillation Counter" Technical Description 1219 LKB Wallac (Finland), no date.
"LS5801 Series Liquid Scintillation Systems" Bulletin 7749 Beckman Instruments, Inc., no date.
"The TRI-CARB® 460C Automatic–Liquid Scintillation System" Operation Manual Publication No. 169-2185/B Packard Instrument Co., Inc. (USA 1980).

Primary Examiner—Carolyn E. Fields
Assistant Examiner—Constantine Hannaher
Attorney, Agent, or Firm—Leydig, Voit & Mayer

[57] ABSTRACT

A method and apparatus for separating background events from valid sample events in a liquid scintillation counter are disclosed. Upon the detection of a coincident event pulse the number of pulses detected during a short time interval immediately thereafter together with the energy level of the event pulse is utilized to determine the probability that the event pulse is a valid sample pulse as opposed to an invalid background pulse. The total count rate is determined by summing pulses over the appropriate energy range where each pulse is counted as one multiplied by the above probability that the pulse is a valid sample pulse.

17 Claims, 1 Drawing Figure

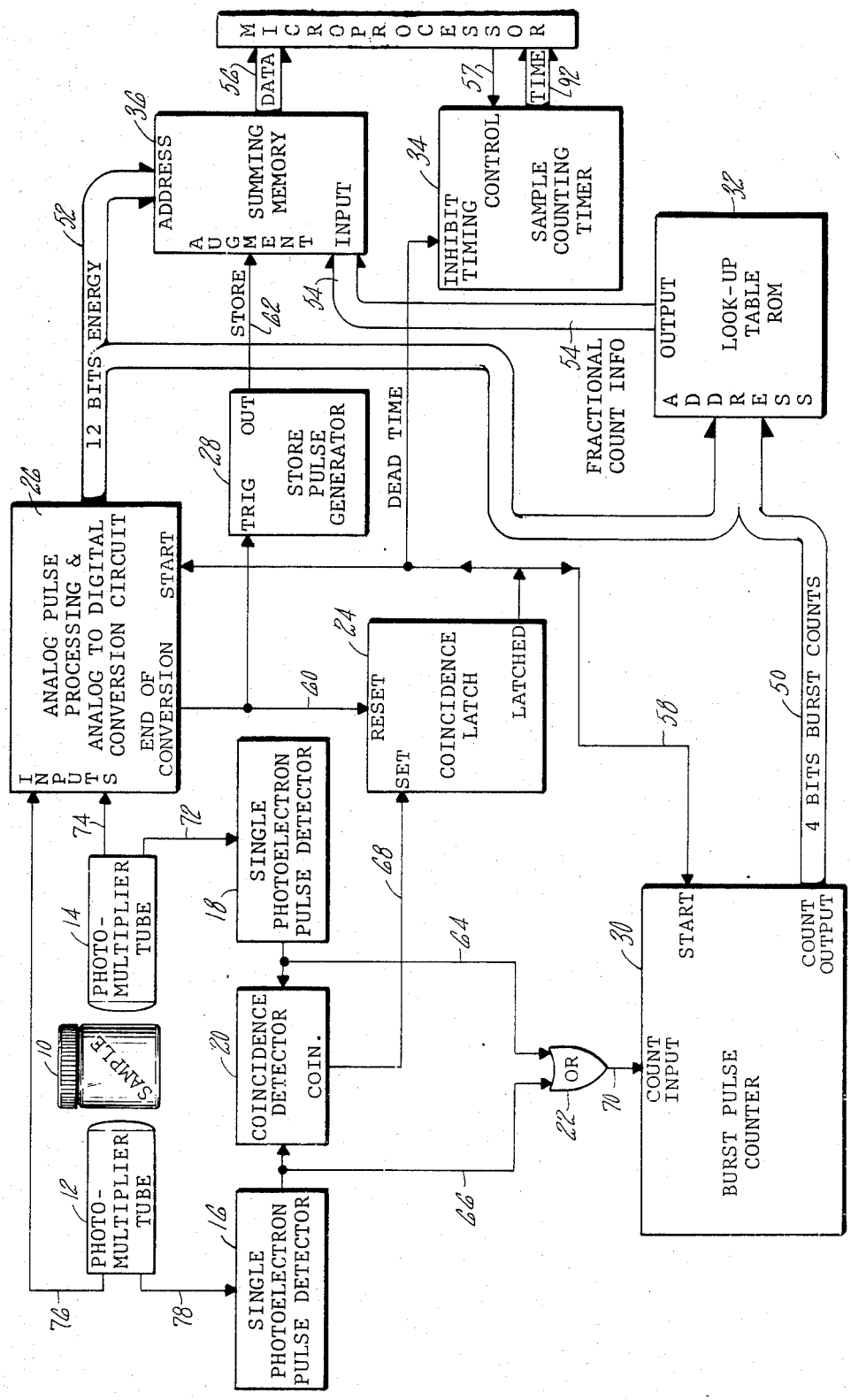

REDUCED BACKGROUND SCINTILLATION COUNTING

DESCRIPTION

1. Field Of The Invention

The invention relates to apparatus and a method useful for determining the count rate of a radionuclide using a liquid scintillation counter. More specifically, the present invention is directed to discriminating against background optical and electrical events in a liquid scintillation counter to improve the accuracy and reliability of the results obtained.

2. Background Of The Invention

Liquid scintillation counting is a generally known and widely used technique for the measurement of low energy beta emitting radionuclides in addition to gamma and alpha emitters. The liquid scintillation counter is utilized to make quantitative measurements of radioactivity by incorporating a radio-labeled analyte into solution with a liquid chemical medium capable of producing photons resulting from the kinetic interactions of nuclear decay products. There are different radionuclides, both man-made and naturally occurring, which can be experimentally employed to illustrate the molecular dynamics of a particular model by measuring their distributions in various systems. It is often desirable to use multiple radionuclides in the same experiment to follow different distributions in the same system simultaneously.

The energy of the beta particles ranges from zero energy to the $E_{max}$ for that radionuclide. A pulse height energy distribution spectra may be recorded for the solution being analyzed. When the solution being analyzed contains a mixture of beta emitters there is an overlap of the spectra from each emitter.

Tritium has developed immense importance in various applications wherein radio-labeled components are utilized. By dissolving a sample containing tritium in a mixture of aromatic solvent containing an organic scintillator, energy from the beta decay is transferred with reasonable efficiency to the scintillator which emits multiple photons of light proportional to energy of the beta particle. The light is detected by sensitive photomultiplier tubes. In a normal state these photomultiplier tubes have a characteristic dark noise which occurs upon the spontaneous emission of an electron within the tube. The dark noise consists of pulses generating approximately a single photoelectron response. Thus, by utilizing multiple photomultiplier tubes and by requiring a coincidental event, beta emitters can be measured while minimizing the reported background. The higher the energy of the beta particle, the more photons will be produced over selected time intervals such as 5-50 nanoseconds. All photons produced within that interval are considered a valid pulse (which shall be referred to as a sample optical event.) The combined amplitude of the photons is known as the pulse height. The range of pulse heights is a smooth distribution of energies ranging from zero energy rising to a maximum and tailing off to the maximum energy of the beta emitting radionuclide. This distribution is known as the pulse-height energy distribution spectra.

Although the use of coincidence detection has acted to discriminate against some background events, it has not acted to eliminate all of them or to prevent those erroneously counted from being statistically significant under certain circumstances. Background always accompanies the detection of sample activity. Background is produced by environmental radiation, static electricity, chemiluminescence, optical crosstalk between photomultiplier tubes residual radioactivity of the vial containing the scintillation solution and the glass used in the photomultiplier tube and electronic noise associated with the photomultiplier tube and electronic circuitry. Lead shielding may be used to reduce environmental radiation which affects the photomultiplier tube and the scintillation solution and proper electrical design, grounding and shielding reduces the effects of electrical noise and static electricity. The remaining noise results in the production of pulses which are similar to those produced by the interaction of beta particles with a liquid scintillator.

Electronic noise from the photomultiplier tube known as "tube noise" can result from electrons emitted from the photocathode due to heated ions within the tube, Cerenkov radiation, cold cathode emission and other sources. Tube noise pulses are shaped identical to pulses due to scintillations from the sample. To distinguish tube noise pulses from sample pulses, two photomultipliers are mounted to "view" the sample in the dark enclosure of the counting chamber. The output pulses from each photomultiplier tube are fed into a single photoelectron pulse detector. This circuit is a simple threshold detector that outputs digital pulses called "singles" when the amplitude of its analog input pulse exceeds a value set for the detection of a single photoelectron in the photomultiplier tube. The singles pulses are fed into a coincidence circuit.

Tube noise pulses are random events, and the fact that tube noise pulses are due to events which are peculiar to an individual photomultiplier tube suggest that the probability of two photomultiplier tubes producing noise pulses simultaneously is relatively small. This is in contrast to production of pulses of photoelectrons due to beta particles in the sample because most beta particles have sufficient energy to produce more than one photon in interactions with the scintillation solution fluor. It is probable that both photomultiplier tubes will simultaneously receive photons due to a single beta decay event. To distinguish pulses due to beta emissions from those due to tube noise, two photomultiplier tubes are arranged to detect the scintillations from the sample. A coincidence circuit is established to check if a singles pulse from one photomultiplier tube is accompanied by a corresponding singles pulse from the other. The time interval allowed (referred to as the coincidence resolving time) within which both tubes must produce a singles pulse is about $2 \times 10^{-8}$ seconds. The requirement that both photomultiplier tubes produce a singles pulse within the coincidence resolving time, for this event to be accepted, excludes the majority of tube noise pulses from the sample. The pulses not excluded are called coincident pulses. A pulse generated to indicate that a pulse is a coincident pulse is called a coincidence pulse (digital).

The photomultiplier tube glass and the scintillation vial glass also generate background due to scintillations within the glass material itself because of excitations by radioactivity in the glass or externally originating cosmic rays. These scintillations are incorrectly interpreted the same as scintillations in the sample and are processed by the photomultiplier tube and the electrical circuitry in the same manner. Other background signals are also available.

In order to discriminate against the background, it is possible to utilize some of the inherent characteristics of the pulses being detected to determine whether or not they are valid sample pulses occurring from a radioactive decay within the scintillation solution or a background pulse. The herein invention concerns the discovery that most background pulses detected by the coincidence circuit tend to have a series of randomly spaced smaller energy pulses of approximate single photoelectron amplitude immediately thereafter. Hence, after a coincident pulse if one continues to observe the output of both photomultiplier tubes simultaneously and if a burst of pulses follows, this is an indication that it is a background scintillation or electrical event and that the measured energy of the coincident pulse is erroneous and should not be used in determining the overall energy spectra of the radionuclide being monitored. The number of summed singles pulses (which is the electrical summation of the singles pulses from each photomultiplier tube's single photoelectron detector with a digital OR gate) following a coincidence pulse in a predetermined time period of approximately 5 microseconds may be utilized simply to determine whether or not the coincident pulse will be counted. The number of summed singles pulses following the coincident pulse together with the energy level of the coincident pulse may also be utilized to select a probability factor indicative that the coincident pulse is the result of a valid sample scintillation as opposed to an invalid background scintillation and this pulse will be fractionally counted based on the probability of the coincident pulse being valid. The analog equivalent to counting the number of singles pulses following the coincident pulse is to determine, by integration, the area under the waveform of the pulses following the coincident pulse during the predetermined time period. The determined area may then be utilized to ascertain a probability factor indicative that the coincident pulse is a valid sample pulse.

The shape of a pulse may also be utilized to predict the probability that the coincident pulse is valid. Pulse shape as used herein refers to any physical parameter of a specific pulse or series of pulses including the area under the pulses. However the shape of the pulse and the number of pulses following a coincidence pulse are both dependent on oxygen quenching. The degree of oxygen quenching should be considered when calculating the probability that the pulse is valid.

A commonly used measurement of the ability of the circuit to discriminate between background and sample pulses is referred to as $E^2/B$ where the E is the efficiency expressed as a percentage. Efficiency is the percentage of disintegrations per minute that are counted by the scintillation counter. In other words, if the radionuclide actually has 10,000 disintegrations per minute but the counter only counts 5,000 disintegrations per minute due to innumerable factors such as quenching, threshold levels and others, then it is determined that the efficiency is 50%. Squaring this percentage will give the number 2500.

Background or B is determined by measuring the counts per minute with scintillator only and no sample radionuclide in the vial located in the scintillation counter. Typical values for $E^2/B$ for having a high quality count are 180 for tritium and 380 for Carbon 14. Utilizing the burst detector as identified hereinafter, values as high as 483 for tritium and 1798 for carbon 14 have been measured.

SUMMARY OF THE INVENTION

It is an object of the present invention to provide an improved liquid scintillation counter capable of determining reliably and accurately the appropriate count rate for a radionuclide.

It is another object of the present invention to provide method and apparatus for discriminations between sample scintillations and background scintillations or electrical events.

It is a still further object of the present invention to provide apparatus and a method based upon a burst rate of pulses following a coincident pulse and the energy of the coincident pulse to determine the probability that a coincident pulse was based on a sample scintillation as opposed to an invalid non-sample scintillation or electrical noise.

It is a still further object of the present to provide a safe, economical and reliable scintillation counter.

Other objects will be apparent from the description to follow and the appended claims.

These and other objects are achieved by providing a scintillation system for counting sample optical events resulting from the radioactive decay of a constituent of a sample to be measured while reducing the counting of background events which are all optical events other than sample optical events and which create electric pulses other than pulses representing a sample optical event. The scintillation system includes plural means located adjacent the sample for detecting optical events and for converting optical events into analog electrical pulses, energy calculation means connected to receive the analog electrical pulses and for converting coincident pulses received from the plural means into digital signals indicative of the energy level of the coincident pulses, burst detection means connected to receive the analog electrical pulses and for determining the number of analog electrical pulses present in a selected interval, and evaluation means connected to the burst detection means and the energy calculation means for determining, in response to the number of analog pulses immediately following the coincident pulses and the energy level of the coincident pulses the extent to which the optical event detected should be treated as a sample optical event or a background event.

The invention additionally includes a scintillation counting system using light detection means to determine the characteristics of a sample containing a radionuclide which decays and interacts with the scintillator to provide a sample optical event and which is subject to background optical event pulses and electrical events which may reduce the reliability of the results of the counting system. The scintillation counting system further includes at least two light detection means located adjacent the sample and serving to detect a sample optical event and to convert that event to an analog electrical pulse representative of the energy level of the event. The scintillation counting system further includes coincidence means connected to both light detection means for determining the presence of an event pulse based on substantially simultaneous receipt of analog electrical pulses from each of the light detection means, burst detection means connected to both the light detection means and the coincidence means for determining the number of pulses received during an interval following an event pulse, evaluation means connected to the light detection means for calculating the energy level of the event pulse and the burst detection means for comparing the number detected by the burst detection means and the energy level of the event pulse to a known table to determine the probability that the event pulse is representative of a sample optical event, and means connected to the evaluation means for summing the event pulses counted for a sample wherein each event pulse is weighted based on the probability determined by the evaluation means.

Additionally, disclosed is a method of improving the reliability of the results of a scintillation counting system wherein valid sample optical events are detected and converted into electrical pulses and which is subject to other invalid background optical events and invalid background electric pulses which includes the steps of detecting sample optical events, converting the sample optical events into electric pulses representative of the energy level of the detected event, determining that a pulse is likely to be a sample pulse by requiring simultaneous detection of a sample optical event and conversion of that event into an electric pulse through two different means, counting the number of electric pulses received in a time interval after the likely sample pulse, and ascertaining the probability that the sample pulse is a valid pulse by comparing the number of electric pulses from the step of counting and the energy of the pulse from the step of converting to a known table of probabilities.

BRIEF DESCRIPTION OF THE DRAWING

FIG. 1 is a diagrammatic view of a liquid scintillation counter.

DESCRIPTION OF THE PREFERRED EMBODIMENT

The invention herein will be described in reference to a block diagram indicating the various elements and steps provided in a liquid scintillation counter. It is to be understood that this apparatus and process could be used with other types of scintillation counters and that the various logic steps need not necessarily follow in the order as presented.

The liquid scintillation sample 10 is mounted in a shielded area wherein photomultiplier tubes 12 and 14 may be utilized to detect optical events. As the radionuclide in the sample decays, beta particles are emitted which contact liquid solution of the sample and act to energize a fluor. The fluor converts the energy from the beta particle into an optical event which is detected by the photomultiplier tube. The photomultiplier tube as gated through photoelectron pulse detectors 16 and 18 generates an analog electrical pulse representative of the energy level of the detected event. Detectors 16 and 18 are connected by wires 72 and 78 to the photomultiplier tubes. The digital pulse emitted by single photoelectron pulse detectors 16 and 18 called the "singles" pulse is directed to coincidence detector 20 and to OR gate 22 through wires 64 and 66 and represents the fact that an analog pulse of at least a single photoelectron amplitude has been detected. The coincidence detector 20 identifies that when a single pulse occurs substantially simultaneously at both photomultiplier tubes and in response thereto transmits, a coincidence signal over wire 68 to coincidence latch 24. OR gate 22 acts to pass all of the two singles signals received from single photoelectron pulse detectors 16 and 18 and delivers them as count inputs over wire 70 to burst pulse counter 30. Such inputs may be called the summed singles signal.

Wires 76 and 74 additionally connect photomultiplier tubes 12 and 14 to analog pulse processing and analog-to-digital conversion circuit 26. This circuit acts to shape the appropriate analog pulses and to provide a digital output signal indicative of the energy level of a particular pulse. This output signal is carried over bus 52 indicated to carry 12 bits of information. Bus 52 extends from analog pulse processing and analog-to-digital conversion circuit 26 to look-up table ROM 32 and to summing memory 36.

Burst pulse counter 30 is likewise connected with a four-bit data bus 50, to deliver burst counts to look-up table ROM 32. Look-up table ROM 32 is a table of probabilities based on both the number of burst counts following a coincidence signal within a predetermined time window which is supplied over bus 50 and the energy level of the pulse which is supplied over bus 52. Having these two inputs a probability factor is determined at look-up table ROM 32 which is conveyed over bus 54 to summing memory 36. The pulse value of 1 is multiplied by the probability that it is a valid sample pulse as opposed to an invalid background pulse and is summed in memory 36. This information is then provided over data bus 56 to the microprocessor associated with the liquid scintillation counter as is known in the art.

Coincidence detector 20 additionally provides a coindicence signal over wire 68 to coincidence latch 24. This signal acts to set the coincidence latch. Once coincidence is detected, and if the latch is not currently latched indicating a busy condition, the latch signal is generated by coincidence latch 24. This latch signal is disseminated over wire 58 to burst pulse counter 30 to effect starting of the time interval after the coincidence pulse during which the burst pulse counter will count pulses. A signal is also delivered over wire 58 to analog pulse processing, analog-to-digital conversion circuit 26 to commence operation of that circuit relative to the coincidence pulse and it is connected to sample counting timer 34 to indicate to that circuit that the sample counting timing is inhibited. Sample counting timer 34 is started, stopped, and reset by the microprocessor through signal path 57 and the sample counting time is provided to the microprocessor through bus 92.

Additionally, extending from analog pulse processing, analog-to-digital conversion circuit 26 is wire 60 which indicates the end of the conversion process for a particular pulse. Wire 60 is connected to coincidence latch 24 to effect reset of the coincidence latch after the pulse has been processed and converted and is connected to store pulse generator 28 to trigger the store pulse generator to have the summing memory add a particular pulse of fractional count value supplied by bus 54 to its memory. Output 62 from store pulse generator 28 carries a signal therefrom to summing memory 36.

Method of Operation

When both photomultiplier tubes generate the appropriate pulses indicating that a sample pulse has been detected and the coincidence detector detects that said pulses have occurred at the same time, then an appropriate signal is generated to coincidence latch 24 to provide a latch signal. In the interim all pulses detected by the photomultiplier tubes, both of both the valid sample pulses and invalid optical events from the sample glass or the photomultipler tube glass or electrical noise, are passed on by the photomultiplier tubes to the single photoelectron pulse detectors 16 and 18 and therefrom through OR gate 22 to the burst pulse counter 30 via wire 70. Once coincidence detector 20 detects a coincident signal the signal acts to set coincidence latch 24 which then starts the time interval for burst pulse counter 30. It is during this time interval that the number of pulses following the coincidence pulses is detected and it is this number that is supplied to the look-up table ROM via data bus 50. Burst pulse counter 30 is designed to have a time interval built therein such that the length of the time window during which pulses are counted is known and is on the order of 3 to 9 microseconds.

Coincidence latch 24 also when generating a latch signal acts to start analog pulse processing and analog-to-digital conversion circuit 26. Analog pulse processing and analog-to-digital conversion circuit acts to generate a 12-bit digital signal indicative of the energy level of the pulses received from photomultiplier tubes 12 and 14. Once the process of converting the signal to a 12-bit digital signal is completed an end of conversion signal is sent over wire 60 to reset the coincidence latch and to trigger the store pulse generator.

The energy level of the pulse from analog pulse processing analog-to-digital conversion circuit 26 is conveyed over data bus 52 and the burst count is conveyed over data bus 50. Both counts are conveyed to look-up table ROM 32 and are utilized to determine the probability that the event indicated by the coincidence detector to be a coincident pulse is an actual sample event to be utilized in determining the spectra of the radioactive decay of the radionuclide within the sample. As the number of burst counts in the time interval following the coincident pulse increases the probability that the coincidence pulse is a valid sample pulse decreases. Additionally, this probability varies with the overall energy level of the coincident pulses at conductors 76 and 74. Hence, the look-up table concerns itself with both the number of burst count in the time interval and the energy level of the coincident pulses. From these two factors the probability that it is a valid sample pulse is determined. This probability value in theory is assigned a number between zero and 1. The probability value is supplied to summing memory 36.

The end of conversion signal from analog pulse processing analog-to-digital conversion circuit 26 is received by stored pulse generator 28 as a trigger signal. In response thereto the output from store pulse generator 62 tells summing memory 36 to add a count at the given energy level to the register summing counts of that level or to add a count or fraction thereof at a specific energy level depending upon the specific pulse. Fractional count information is provided over bus 54 from look-up table 32. Hence, the summing memory multiples a count value of 1 times the fractional count information which is the probability that it is a valid sample and enters that value in its memory. For instance if the theoretical probability is 0.7 that a pulse is a valid sample pulse then the summing memory will identify the appropriate energy level and a number of 0.7 will be added to the other numbers at that energy level to indicate the total number of counts for that particular energy level for the sample being monitored.

The burst pulse counter is a combination of a gated counter and a timer. The counter is originally set to zero and the presence of the start pulse on wire 58 allows no more resets. The start pulse starts the timer. The timer enables the counting gate and permits summed singles, received from wire 70, to be counted. (Note that the singles involved in generating the coincidence signal are not counted.) The counting of summed singles (burst counts) continues until the timer times out (approximately 5 microseconds later) and the counting gate is disabled. The counted value is then held in the counter and on bus 50 until the fractional count information on bus 54 is stored in the memory 26.

The single photoelectron pulse detectors 16 and 18 each include a voltage threshold detector that outputs a digital pulse of fixed width in the area of 50–200 nanoseconds when its analog input amplitude exceeds an amplitude corresponding to a suitable level for detecting a single photoelectron pulse from the photomultiplier tube. It is able to detect input pulses as short as 2 nanoseconds.

The remainder of the components are basically known components which may be assembled in the manner described and perform the functions as designated. The microprocessor is equivalent to the microprocessors incorporated in the current products offered by liquid scintillation counter manufacturers in the U.S.A.

The invention has been described relative to determining the probability that a coincident pulse reflects a valid sample optical event based on the burst count. The pulse shape may also be used to make this determination.

Additionally other functions than probability may be used to indicate the validity of the overall counting process. Furthermore multiple look-up tables could be used depending on efficiency levels desired and the $E^2/B$ ratios desired.

The invention has been described herein with reference to a particular embodiment. It is to be understood by those skilled in the art that variations and modifications can be effected within the spirit and scope of the invention.

I claim:

1. A liquid scintillation system for counting sample optical events resulting from the radioactive decay of a constituent of a sample to be measured in a liquid scintillator while reducing the counting of background events which are all optical events other than sample optical events and which are electrical pulses other than electrical pulses representing a sample optical event which comprises:
   a plurality of detection means located adjacent the sample for detecting optical events and for converting optical events into electrical pulses;
   coincidence sensing means for receiving said electrical pulses from said plurality of detection means and producing a coincidence signal when said electrical pulses from said plurality of detection means coincide with each other;
   burst detection means for receiving said coincidence signals from said coincidence sensing means and said electrical pulses from said plurality of detection means for determining the number of electrical pulses present in a selected interval following each of said coincidence signals; and
   evaluation means connected to the burst detection means for determining, in response to the number of electrical pulses detected in said selected interval, the extent to which the optical event represented by the corresponding coincidence signal should be treated as a sample optical event or a background event.

2. The apparatus as set forth in claim 1 wherein the evaluation means further comprises means to prevent an electrical pulse from being treated as a sample optical event if the burst detection means detects a number of electrical pulses during the selected interval which number is equal to or greater than a predetermined number for that interval.

3. The apparatus as set forth in claim 1 wherein the evaluation means further comprises:
means for determining the probability that each of said coincidence signals is generated in response to a sample optical event by comparing the number of electrical pulses detected in the selected interval and the energy level of the corresponding coincident electrical pulses with a known table having assigned probability factors for each combination of pulse energy level and number of electrical pulses detected in said selected interval.

4. The apparatus as set forth in claim 3 and further comprising summing means for summing the number of sample optical events at a given energy level wherein the number for a sample optical event is a fractional value equal to the probability expressed as a fraction that the electrical pulse is due to a sample optical event.

5. The apparatus as set forth in claim 1 wherein the evaluation means determines the probability that a coincidence signal is generated in response to a sample optical event by comparing the number of electrical pulses detected by the burst detection means following the coincidence signal and a digital signal indicative of the energy level of the corresponding electrical pulses to a known table of probabilities based on pulse energy level and the number of electrical pulses detected in said selected interval.

6. The apparatus as set forth in claim 5 and further comprising:
logic means wherein the logic means determines sample pulse height energy distribution spectra based on counting trigger pulses at varying energy levels and wherein each trigger pulse is counted as a full or partial count at a particular energy level based on the probability ascertained by the evaluation means.

7. A scintillation counting system using light detection means to determine a characteristic of a sample containing a radionuclide which decays and interacts with a scintillator to provide a sample optical event and which is subject to background light and electrical events which may reduce the reliability of the results of the counting system which comprises:
at least two light detection means located adjacent the sample and serving to detect a sample optical event and convert that event to an electrical pulse representative of the energy level of the event;
coincidence means connected to both light detection means for determining the presence of a coincident event pulse based on the substantially simultaneous receipt of electrical pulses from each of the light detection means;
burst detection means connected to both light detection means and the coincidence means for determining the number of pulses received during an interval following a coincident event pulse;
evaluation means connected to the light detection means and the burst detection means for comparing the number detected by the burst detection means and the energy level of the coincident event pulse to a known table to determine the probability that the event pulse is representative of a sample optical event; and
means connected to the evaluation means for summing the event pulses counted for a sample wherein each event pulse is weighted based on the probability determined by the evaluation means.

8. A method of improving the reliability of the results of a scintillation counting system wherein valid sample optical events are detected and converted into electrical pulses and which is subject to other invalid background optical events and invalid background electric pulses which comprises the steps of:
detecting sample optical events;
converting the sample optical events into electric pulses representative of the energy level of the detected event;
determining that a pulse is likely to be a sample pulse by requiring simultaneous detection of a sample optical event and conversion of that event into an electric pulse through two different means;
counting the number of electric pulses received in a time interval after the sample pulse; and
ascertaining the probability that the sample pulse is a valid pulse by comparing the number of electric pulses from the step of counting and the energy of the pulse from the step of converting to a known table of probabilities.

9. The method as set forth in claim 8 and further comprising the step of:
compiling sample information by summing the specific sample pulses wherein each sample pulse is weighted based on the probability that the sample pulse is a valid pulse determined by the step of ascertaining.

10. The method as set forth in claim 8 and further comprising the steps of:
counting the number of samples pulses of a predetermined energy level within a sample period; and
counting each sample pulse as having a count value between zero and one depending on the probability determined from the step of ascertaining.

11. The method as set forth in claim 8 and further comprising the step of:
generating an energy distribution spectra for a sample utilizing as the number of sample events at a given energy level a sum of the number of sample events each probability weighted from the step of ascertaining.

12. A method of improving the reliability of the results of a liquid scintillation counting system wherein valid sample optical events are detected and converted into electrical pulses and which is subject to other invalid background optical events and invalid background electric pulses which comprises the steps of:
detecting sample optical events at a plurality of positions around the liquid scintillator;
converting the sample optical events into electric pulses representative of the energy level of the detected event;
determining that an electrical pulse is likely to be a sample pulse by requiring simultaneous detection of an optical event and conversion of that event into an electric pulse through two different means;

counting the number of electric pulses received in a selected time interval after the simultaneous detection of an optical event; and comparing the number of electric pulses from the step of counting to a preselected number to determine the extent to which said simultaneously detected optical event should be treated as a sample optical event or a background event.

13. A method of improving the reliability of the results of a scintillation counting system wherein valid sample optical events are detected and converted into electrical pulses and which is subject to other invalid background optical events and invalid background electric pulses which comprises the steps of:

detecting sample optical events;

converting the sample optical events into electric pulses representative of the energy level of the detected event;

determining that a pulse is likely to be a sample pulse by requiring simultaneous detection of a sample optical event and conversion of that event into an electric pulse through two different means;

ascertaining the shape of the sample pulse;

fitting the shape of the sample pulse to a series of known shapes to obtain the best fit known shape;

determining from the best fit known shape the probability that the sample pulse is a valid sample pulse; and compiling sample information by summing the sample pulses where each pulse has been weighted by the determined probability that it is a valid sample pulse.

14. A method of counting optical events caused by the radioactive decay of a constituent of a sample in a liquid scintillator, said method comprising the steps of:

detecting optical events at a plurality of positions around the liquid scintillator, sensing the coincidence of detection of optical events at said plurality of positions around the liquid scintillator, counting the number of "singles" optical events detected within a selected interval following each coincident detection of optical events, and determining from said number of "singles" optical events counted in each of said selected intervals, the extent to which the corresponding coincident detection of optical events should be treated as a sample optical event or a background optical event.

15. The method of claim 14 wherein said optical events are detected on opposite sides of the liquid scintillator.

16. The method of claim 14 which includes the steps of predetermining the probability of a coincident detection of optical events representing a sample optical event as a function of (1) the number of "singles" optical events detected in said selected interval following the coincident detection, and (2) the energy level of the coincident optical events, sensing the energy level of the coincident optical events, and determining from said counted number of "singles" optical events and said sensed energy level the corresponding predetermined probability of each coincident detection of optical events representing a sample optical event.

17. The method of claim 16 which includes the step of summing the coincident optical events with each such event being weighted by the corresponding probability determined therefor.

* * * * *

UNITED STATES PATENT AND TRADEMARK OFFICE
CERTIFICATE OF CORRECTION

PATENT NO. : 4,651,006
DATED : 3/17/87
INVENTOR(S) : Robert J. Valenta

It is certified that error appears in the above-identified patent and that said Letters Patent are hereby corrected as shown below:

Column 8, line 13, delete "26" and insert --36--;
Column 9, line 44, delete "trigger" and insert --coincident--;
line 45, delete "trigger" and insert --coincident--.

Signed and Sealed this

Seventeenth Day of May, 1988

Attest:

DONALD J. QUIGG

*Attesting Officer*   *Commissioner of Patents and Trademarks*